Feb. 21, 1933. U. A. WHITAKER 1,898,513
QUICK SERVICE BRAKE DEVICE
Filed March 12, 1929
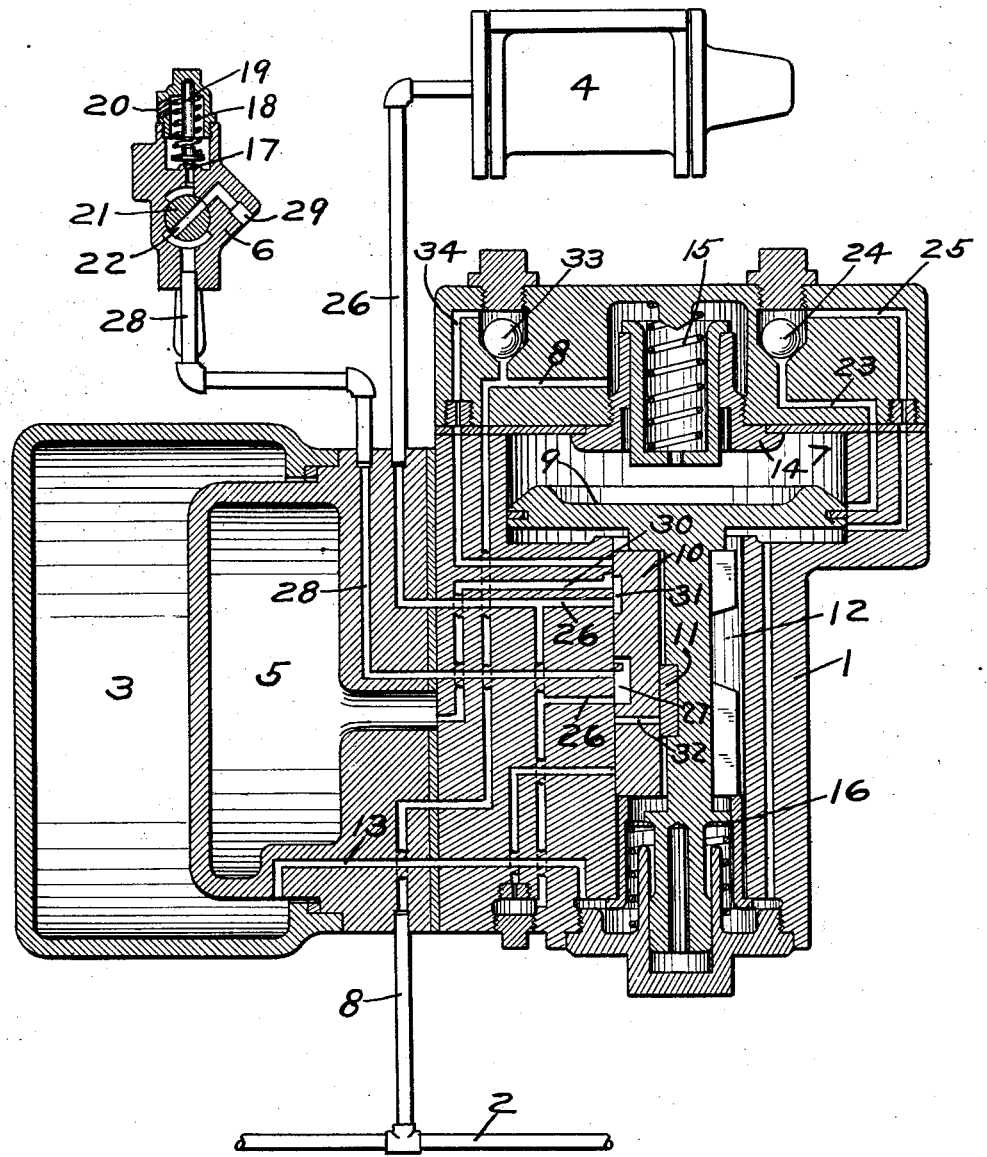
INVENTOR
UNCAS A. WHITAKER
BY Wm. M. Cady
ATTORNEY Patented Feb. 21, 1933

1,898,513

UNITED STATES PATENT OFFICE

UNCAS A. WHITAKER, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA

QUICK SERVICE BRAKE DEVICE

Application filed March 12, 1929. Serial No. 346,343.

This invention relates to fluid pressure brake equipment for railway cars and has for its principal object to provide improved means for effecting a local reduction in brake pipe pressure to accelerate the action of the triple valve devices to service position throughout the length of a train.

Heretofore, in some cases, it has been the practice to provide a quick service chamber or bulb into which fluid under pressure from the brake pipe is vented when an application of the brakes is effected and to completely vent the fluid under pressure from this chamber or bulb to the atmosphere when the triple valve device is operated to release position. Where the quick service chambers or bulbs are of sufficient volume to ensure the propagation of a quick service action serially throughout the length of a long train in effecting a service application of the brakes, it has been found that such action, during cycling operations on a grade, will be too violent, in that, too high a brake cylinder pressure will be obtained, resulting in an undesirable harsh application of the brakes. The brake cylinder pressure obtained in such cases would be the pressure of fluid retained in the brake cylinder plus the pressure of fluid supplied upon effecting a reduction in brake pipe pressure by the use of the usual manually operable means and the means for propagating the quick service action.

Another object of my invention is to provide a fluid pressure brake equipment embodying means operative to overcome the aforementioned objectionable features and for insuring the proper gentle braking action in cycling.

A further feature of my invention is to provide a fluid pressure brake equipment embodying means operative in cycling the brakes for effecting a local reduction in brake pipe pressure according to the pressure of fluid retained in the brake cylinder.

Other objects and advantages will appear in the following more detailed description.

In the accompanying drawing, the single figure is a diagrammatic view, mainly in section, of a fluid pressure brake equipment embodying my invention.

According to my invention and as illustrated in the drawing, the fluid pressure brake equipment may comprise a triple valve device 1, a brake pipe 2, an auxiliary reservoir 3, a brake cylinder 4, a quick service bulb or chamber 5 and the usual pressure retaining valve device 6.

The triple valve device may comprise a casing having a piston chamber 7 connected to the brake pipe 2 through a pipe and passage 8 and containing a piston 9 which is adapted to operate a main slide valve 10 and a graduating slide valve 11, both being contained in a chamber 12 which is connected to the auxiliary reservoir 3 through a passage 13.

Also contained in the piston chamber 7 is a stop 14 subject to the pressure of a spring 15 and with which the piston 9 is adapted to engage.

The triple valve device illustrated in the drawing is of the retarded release type having spring stop means 16 for resisting the movement of the triple valve parts from full release position, but it will be understood that my improvements may be applied to other types of triple valve devices.

The pressure retaining valve device 6 may be of the usual type having a casing containing a valve 17 subject to the pressure of a spring 18 contained in a chamber 19 which is connected to the atmosphere through a choke plug 20 for retaining a predetermined brake cylinder pressure while recharging the equipment in cycling. Rotatably mounted in the casing is a plug valve 21 having a passage 22, said valve in one position being adapted to fully vent the brake cylinder to the atmosphere and in another position being adapted to permit the valve 17 to control the venting of the brake cylinder.

With the triple valve device 1 in full release position, as shown in the drawing, fluid under pressure supplied to the brake pipe 2, in initially charging the equipment, flows to the auxiliary reservoir 3 through pipe and passage 8, piston chamber 7, a passage 23, past a ball check valve 24, through a passage 25, valve chamber 12 and passage 13.

When the valve 21 of the retaining valve device 6 is in the position shown in the drawing and the triple valve device is in full release position, the brake cylinder 4 is connected to the atmosphere through a pipe and passage 26, a cavity 27 in the main slide valve, a passage and pipe 28, passage 22 in the valve 21 of the retaining valve device 6 and atmospheric passage 29. The quick service reservoir is also connected to the atmosphere by way of a passage 30, a cavity 31 in the main slide valve and passage 26, and through the retaining valve device 6.

If it is desired to make a service application of the brakes after the equipment has been thus fully charged, a gradual reduction in brake pipe pressure is effected in the usual manner, and upon effecting such a reduction, the triple valve piston 9 moves upwardly from its full release position, causing the graduating slide valve 11 to first move relatively to the main slide valve, and by such movement uncovers a service port 32 in the main slide valve. The continued upward movement of the piston 9 causes the main slide valve 10 to move to service position in which the service port 32 registers with the brake cylinder passage 26, so that fluid under pressure is supplied from the auxiliary reservoir to the brake cylinder and in which communication between the quick service chamber 5 and the brake cylinder is closed off and communication is established from the brake pipe 2 to the quick service chamber by way of pipe and passage 8, past a ball check valve 33, a passage 34, cavity 31 in the main slide valve and passage 30, thus locally venting fluid under pressure from the brake pipe to the quick service chamber. This local venting of fluid under pressure from the brake pipe at each triple valve throughout the length of the train causes the quick serial action of the triple valve devices to service position.

If it is desired to graduate the brakes on, a light reduction in brake pipe pressure may be effected by moving the usual brake valve device (not shown) to service position and then to lap position. When the brake valve device is moved to service position, the piston 9 operates the slide valves to service position in which fluid under pressure is supplied to the brake cylinder in the same manner as described, and fluid under pressure is vented from the brake pipe to the quick service chamber 5, causing the quick serial action of the triple valve devices to be propagated throughout the length of the train. Now when the brake valve device is moved to lap position, the piston 9 operates the graduating slide valve 11 to lap position in which the flow of fluid under pressure from the auxiliary reservoir to the brake cylinder is cut off, thus limiting the pressure of fluid in the brake cylinder to effect a light application of the brakes to gather the slack in the train.

When it is desired to increase the brake cylinder pressure, the brake valve device may be moved again to service position in which fluid under pressure is again supplied from the auxiliary reservoir to the brake cylinder. It will be noted that in graduating the brakes on, fluid under pressure is vented from the brake pipe to the quick service chamber 5 when the initial application of the brakes is effected, and in each succeeding application, the quick service feature is rendered ineffective to vent fluid under pressure from the brake pipe due to the quick service chamber 5 being charged with fluid at brake pipe pressure. Since the quick service feature is thus rendered ineffective, the control of the brakes in effecting applications of the brake after an initial application has been effected, the operator will have complete control of the brakes.

To release the brakes after a service application, the brake pipe pressure is increased in the usual manner, causing the triple valve device to operate to full release position in which fluid under pressure from the brake cylinder 4 and quick service chamber is completely vented to the atmosphere and the equipment recharged.

Preparatory to descending a grade, the valve 21 of the retaining valve device 6 is operated to such a position that the unrestricted atmospheric passage 29 is closed off and the passage 22 in the valve 21 leads to the under side of the valve 17.

In effecting the first application of the brakes on the grade, the triple valve device operates to service position, in which, fluid under pressure is supplied to the brake cylinder and, in which, fluid under pressure from the brake pipe 2 is vented to the quick service chamber 5, in the same manner as has hereinbefore been described. Now, to recharge the equipment and maintain the brakes applied, the brake pipe pressure is increased in the usual manner, causing the triple valve device to operate to release position, in which, the auxiliary reservoir 2 is recharged with fluid under pressure from the brake pipe. Since, with the triple valve device in full release position, the passage 30 leading from the quick service chamber 5 is connected with the brake cylinder passage 26 and the passage 26 is connected to the passage 28, fluid under pressure from the brake cylinder and quick service chamber is discharged through the passage and pipe 28, passage 22 in the valves 21 of the retaining valve device, past the valve 17 and through the choke plug 20.

The pressures of fluid in the brake cylinder and quick service chamber 5 will reduce together slowly through the choke plug 20, and when these pressures have been reduced to a predetermined degree, the pressure of the spring 18, in the retaining valve device, causes the valve 17 to seat and close off the further flow of fluid from the brake cylinder and quick service chamber 5 to the atmosphere, thus maintaining the brakes applied with a predetermined brake cylinder pressure.

Now, when a reapplication of the brakes is effected, the amount of the local reduction in brake pipe pressure will be proportional to the pressure retained in quick service chamber 5 and brake cylinder, which reduction will be less than would be the case if the quick service chamber were completely vented to the atmosphere each time the triple valve device is operated to release position in cycling. If the quick service chamber 5 were completely vented to the atmosphere each time the triple valve device is operated to release position in cycling, the reduction in brake pipe pressure, in effecting a reapplication of the brakes, would be so great that too high a brake cylinder pressure would be obtained which would result in objectionable violent braking action throughout the train. By maintaining the pressure of fluid in the quick service chamber 5 substantially equal to the pressure of fluid in the brake cylinder, the reduction in brake pipe pressure will be such that the braking action throughout the train will not be violent.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake pipe, a brake cylinder and a chamber, of a triple valve device, valve means included in the triple valve device having a release position in which said brake cylinder and chamber are connected together and to the atmosphere and operative to an application position in which fluid under pressure is locally vented from the brake pipe to said chamber and in which fluid under pressure is supplied to the brake cylinder to effect an application of the brakes, and a check valve preventing back flow of fluid under pressure from said chamber to the brake pipe.

2. In a fluid pressure brake, the combination with a brake pipe, a brake cylinder, a reservoir and a triple valve device, of a slide valve included in said triple valve device operative to an application position to connect said brake pipe and reservoir for effecting a predetermined local reduction in brake pipe pressure and to establish communication through which fluid under pressure is supplied to the brake cylinder, and a check valve located between said slide valve and the brake pipe for preventing back flow of fluid under pressure from said reservoir to the brake pipe when the slide valve is in application position.

In testimony whereof I have hereunto set my hand, this 9th day of March, 1929.

UNCAS A. WHITAKER.